(12) United States Patent
Ara et al.

(10) Patent No.: US 7,267,012 B2
(45) Date of Patent: Sep. 11, 2007

(54) ELECTROMAGNETIC FLOWMETER INCLUDING ELECTRODES AND MAGNETIC POLE PLACED IN PROXIMITY ON ONE SIDE OF THE OUTER WALL

(75) Inventors: Kuniaki Ara, Higashi-Ibaraki-gun (JP); Mamoru Konomura, Higashi-Ibaraki-gun (JP); Yoshitaka Chikazawa, Higashi-Ibaraki-gun (JP); Kousuke Aizawa, Higashi-Ibaraki-gun (JP); Rie Aizawa, Yokohama (JP); Junzo Taguchi, Yokohama (JP); Kenji Katsuki, Fujisawa (JP); Noriyuki Takeshima, Yokohama (JP); Takeshi Shimizu, Kisarazu (JP)

(73) Assignees: Japan Atomic Energy Agency, Ibaraki-ken (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/354,075

(22) Filed: Feb. 15, 2006

(65) Prior Publication Data

US 2007/0034015 A1 Feb. 15, 2007

(30) Foreign Application Priority Data

Aug. 11, 2005 (JP) ............................. 2005-233186

(51) Int. Cl.
*G01F 1/58* (2006.01)
(52) U.S. Cl. .................................................. 73/861.12
(58) Field of Classification Search ..................... None
See application file for complete search history.

(56) References Cited

U.S. PATENT DOCUMENTS 4,195,515 A * 4/1980 Smoll ....................... 73/861.13
4,308,753 A * 1/1982 Olson ....................... 73/861.17

FOREIGN PATENT DOCUMENTS

JP 10-176937 6/1998

* cited by examiner

*Primary Examiner*—Harshad Patel
(74) *Attorney, Agent, or Firm*—Wenderoth, Lind & Ponack, L.L.P.

(57) ABSTRACT

An electromagnetic flowmeter designed to use a smaller excitation device and applicable to measurement on tubular channels of various sectional shapes. The electromagnetic flowmeter includes an excitation device for forming a magnetic field perpendicular to an outer wall of a tubular channel, and a pair of electrodes for measuring an electromotive force generated by the movement of the electroconductive fluid across the magnetic field. The electrodes and two magnetic poles of the excitation device are collectively placed on the outer wall at one side of the tubular channel.

10 Claims, 3 Drawing Sheets

⇨ PRIMARY SODIUM
➡ SECONDARY SODIUM

ELECTROMAGNETIC FLOWMETER INCLUDING ELECTRODES AND MAGNETIC POLE PLACED IN PROXIMITY ON ONE SIDE OF THE OUTER WALL

BACKGROUND OF THE INVENTION

1. Technical Field

The present invention relates to an electromagnetic flowmeter for measuring the flow rate of an electroconductive fluid such as a liquid metal flowing in a tubular channel.

2. Description of the Prior Art

An electromagnetic flowmeter for a liquid metal described in Japanese Patent Laid-Open No. 10-176937 for example is known as a conventional electromagnetic flowmeter. This electromagnetic flowmeter has a pair of magnets which are disposed on opposite sides of a tubular channel for flow of a liquid metal, and which form a magnetic field in a direction perpendicular to a longitudinal axis of the tubular channel, and a pair of electrodes for measuring an electromotive force generated by the movement of the liquid metal across the magnetic field. The flow rate of the liquid metal is obtained from the measured value of the electromotive force.

Since the above-described conventional electromagnetic flowmeter is constructed so as to have magnets placed on opposite sides of a tubular channel, there are problems with its use in the case of performing a measurement on a large-diameter pipe line such as that in a fast breeder reactor for practical use. That is, there is a need to install an excitation device of an increased size according to the external size of the pipe line and it is difficult to prepare the necessary installation space. Also, the manufacturing cost of the excitation device is high.

The above-described conventional electromagnetic flowmeter is assumed to be used for measurement on tubular channels in cylindrical form and is capable of accurately measuring the flow rate of a liquid in a tubular channel with comparatively high accuracy if the tubular channel is generally cylindrical. However, the conventional electromagnetic flowmeter is incapable of accurately measuring the flow rate of a liquid in a tubular channel in some other form, e.g., one having an annular sectional shape, and it is difficult to apply the conventional electromagnetic flowmeter to measurement in such a case.

SUMMARY OF THE INVENTION

In view of the above-described circumstances, an object of the present invention is to provide an electromagnetic flowmeter designed to use a smaller excitation device and applicable to measurement on tubular channels of various sectional shapes.

According to the present invention, there is provided an electromagnetic flowmeter for measuring the flow rate of an electroconductive fluid flowing in a tubular channel, the electromagnetic flowmeter including an excitation device for forming a magnetic field perpendicular to an outer wall of the tubular channel, and a pair of electrodes for measuring an electromotive force generated by the movement of the electroconductive fluid across the magnetic field, wherein the electrodes and two magnetic poles of the excitation device are collectively placed on the outer wall of the tubular channel at one side of the same (in an angular range through 180 degrees at the maximum in the circumferential direction of the outer wall of the tubular channel).

The above-described excitation device includes an excitation device using a direct-current excitation method, a permanent magnet excitation method or an alternating-current excitation method.

The above-described electroconductive fluid may be any of fluids having electrical conductivity, e.g., liquid metals and electrolytic fluids including water. In the case of measuring the flow rate of water, however, it is desirable to use an alternating-current sine wave excitation method or an alternating-current square wave excitation method, since the electrical conductivity of water is lower than that of liquid metals.

The above-described tubular channel may have any shape if it forms a channel for the above-described electroconductive fluid. A typical example of the tubular channel is a tubular channel of an annular sectional shape having an inner tube member and an outer tube member coaxial with each other and differing in diameter from each other, and a channel for the electroconductive fluid formed between the inner and outer tube members having a common axis.

According to the present invention, there is also provided an electromagnetic flowmeter for measuring the flow rate of an electroconductive fluid flowing in a tubular channel, the electromagnetic flowmeter including an excitation device having two magnetic poles placed at one side of an outer wall of the tubular channel, one of the magnetic poles being placed so as to stand upright on the outer wall of the tubular channel, the other magnetic pole being placed so that the direction of a magnetic field formed in the vicinity of the above-mentioned one of the magnetic poles is perpendicular to the outer wall of the tubular channel, and a pair of electrodes symmetrically placed on opposite sides of the above-mentioned one of the magnetic poles to measure an electromotive force generated by the movement of the electroconductive fluid across the magnetic field in the vicinity of the above-mentioned one of the magnetic poles.

In the above-described electromagnetic flowmeter, the excitation device has an iron core including a plate portion placed along the outer wall of the tubular channel while being spaced apart from the same by a predetermined distance, and three columnar portions extending from opposite ends and a center of the plate portion, and exciting coils respectively wound around the columnar portions; currents are applied to the exciting coils such that the polarity of a magnetic pole appearing at the top end of the central columnar portion and the polarity of a magnetic pole appearing at the top end of the opposite-end columnar portions in the three columnar portions are opposite to each other; and the pair of electrodes are placed on opposite sides of the top end of the central columnar portion.

The above-described excitation device may alternatively have a columnar iron core placed in a direction generally perpendicular to the outer wall of the tubular channel, and an exciting coil wound around the iron core, the pair of electrodes being placed on opposite sides of the iron core at an end of the iron core on the tubular channel side.

Also, the above-described the excitation device may alternatively have a first iron core including a plate portion placed along the outer wall of the tubular channel while being spaced apart from the same by a predetermined distance, and a pair of columnar portions extending from opposite ends of the plate portion toward the outer wall of the tubular channel, a second iron core generally in the form of a plate placed between a position at which the second iron core faces the top end of one of the columnar portions through the channel for the electroconductive fluid interposed between the second iron core and the columnar portion, and a position at which the second iron core faces the top end of the other columnar portion through the channel for the electroconductive fluid, and exciting coils respectively wound around the columnar portions of the first iron core, the pair of electrodes being placed on opposite sides of the top end of one of the columnar portions of the first iron core.

According to the present invention, the two magnetic poles of the excitation device and the pair of electrodes are collectively placed on the outer wall of the tubular channel at one side of the same, thereby eliminating anxiety about increasing the size of the excitation device even in the case of application to a large-diameter tubular channel in piping for a fast breeder reactor for practical use for example. Therefore, the desired excitation device placement space can be easily provided and an increase in cost of the excitation device due to the increase in size can be avoided. Also, the magnetic flux distribution necessary for flow rate measurement can be formed in the vicinity of the wall surface of the tubular channel. Therefore, the present invention can be applied to measurement on tubular channels of various shapes on which it is difficult to perform measurement with the conventional flowmeter. The present invention ensures that the rate or velocity of an electroconductive fluid can be measured with accuracy in a case where a main flow portion of the electroconductive fluid exists in the vicinity of a wall surface in a tubular channel having an annular sectional shape, a tubular channel having a rectangular sectional shape elongated in one direction, or the like, in particular.

BRIEF DESCRIPTION OF THE DRAWINGS

FIG. 3A is a diagram showing the entire construction;

FIG. 3B is a sectional view taken along line X-X in FIG. 3A;

FIG. 3C is a sectional view taken along line Y-Y in FIG. 3A;

DETAILED DESCRIPTION OF THE PREFERRED EMBODIMENTS

First Embodiment

Figure 1:
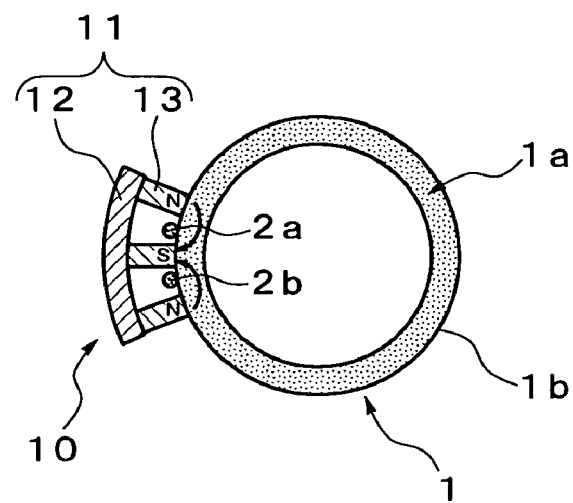
FIG. 1 is a sectional view of a first embodiment of an electromagnetic flowmeter in accordance with the present invention.

FIG. 1 shows a first embodiment of the electromagnetic flowmeter in accordance of the present invention. In FIG. 1, reference numeral 1 denotes a tubular channel. The tubular channel 1 in this embodiment is a tubular channel having an annular sectional shape. An electroconductive fluid flows in an internal channel 1a.

An excitation device 11 for forming a magnetic field in a direction perpendicular to a longitudinal axis of the tubular channel 1 is placed on an outer wall 1b of the tubular channel 1. A pair of electrodes 2a and 2b for measuring an electromotive force generated by the movement of the electroconductive fluid across the magnetic field is also placed on the outer wall 1b. The electrodes 2a and 2b and the two magnetic poles of the excitation device 11 are collectively placed on the outer wall 1b of the tubular channel 1 at one side of the same.

Figure 2:
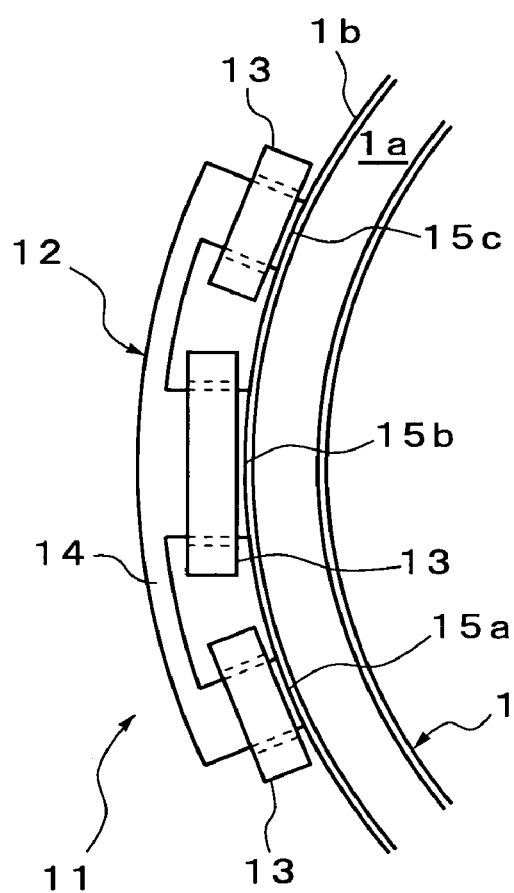
FIG. 2 is an enlarged sectional view of an excitation device.

The excitation device 11 is constituted by a combination of an iron core 12 and excitation coils 13. As shown in FIG. 2, the iron core 12 has a plate portion 14 having a circular-arc shape in section and placed along the tubular channel outer wall 1b while being spaced apart from the same by a certain distance, and three columnar portions 15a, 15b, and 15c extending radially inwardly toward the tubular channel outer wall 1b from opposite ends and a center of the plate portion 14 as defined along the circumferential direction. On opposite sides of the central columnar portion 15b (between the columnar portions), the electrodes 2a and 2b are symmetrically placed along the tubular channel outer wall 1b so as to straddle magnetic fluxes described below. Exciting coils 13 are respectively wound around the columnar portions 15a, 15b, and 15c. Currents are applied to the exciting coils 13 such that the magnetic pole appearing at the top end of the central columnar portion 15b is opposite to those appearing at the top ends of the side columnar portions 15a and 15c. In this embodiment, the magnetic pole at the top end of the central columnar portion 15b is set as an S pole, while the magnetic poles at the top ends of the side columnar portions 15a and 15c are set as an N pole.

In the electromagnetic flowmeter 10 constructed as described above, when currents are applied to the exciting coils 13, magnetic fluxes are generated from the top ends (N pole) of the side columnar portions 15a and 15c to the top end (S pole) of the central columnar portion 15b to form a resultant magnetic field in the vicinity of the top end of the central columnar portion 15b in a direction perpendicular to the tubular channel outer wall 1b (a diametric direction of the tubular channel 1). As a result, an electromotive force according to the flow rate of the electroconductive fluid is generated in the electroconductive fluid in the vicinity of the top end of the central columnar portion 15b in a direction perpendicular to both the direction of the magnetic field (diametric direction of the tubular channel 1) and the direction of flow of the electroconductive fluid (axial direction of the tubular channel 1), namely, in a direction along a line connecting the two electrodes 2a and 2b, in accordance with the Faraday's law of electromagnetic induction This electromotive force is derived from the two electrodes 2a and 2b. The rate or velocity of flow of the electroconductive fluid is obtained from the measured value of the electromotive force.

An example of application of the above-described electromagnetic flowmeter 10 will be described with reference to FIGS. 3A to 3C.

Figure 3A:
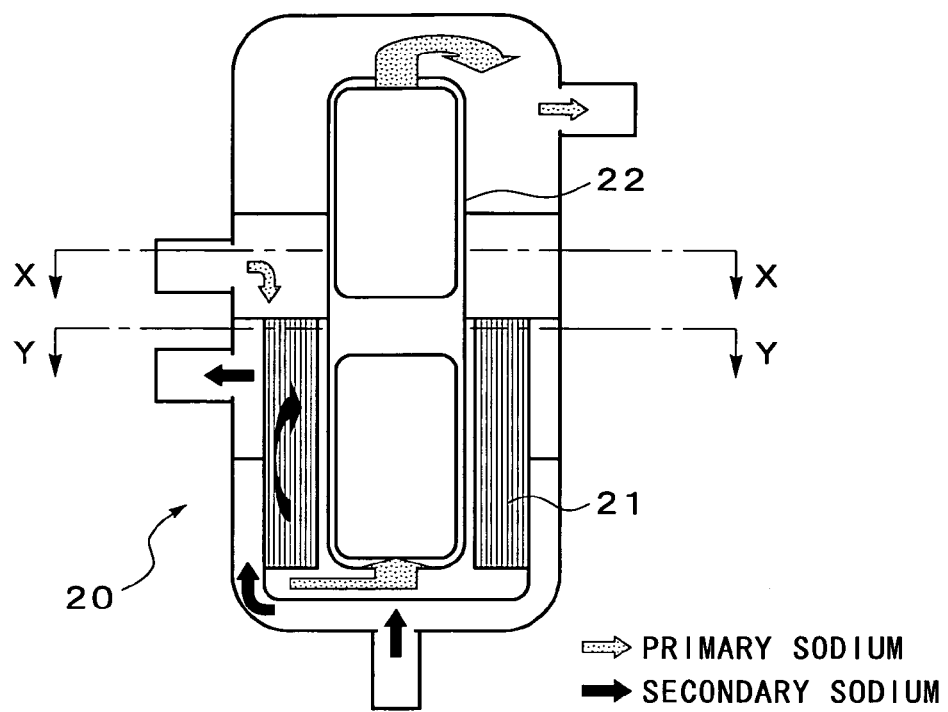
FIGS. 3A to 3C are diagrams schematically showing the construction of an electromagnetic pump incorporation-type intermediate heat exchanger in a sodium-cooled reactor.
Figure 3B:
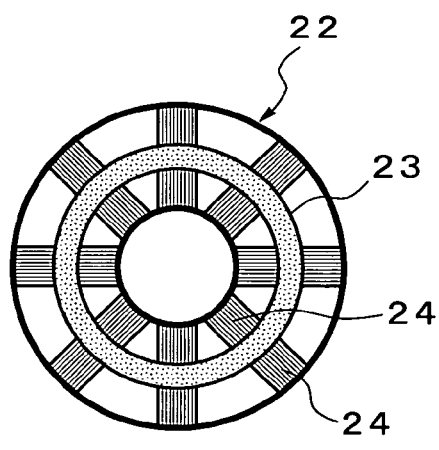
Figure 3C:
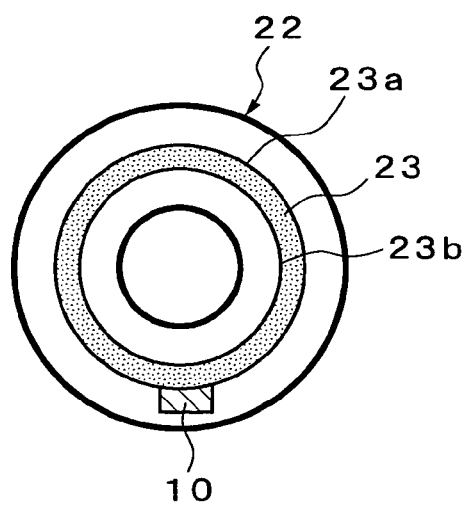

FIGS. 3A to 3C are diagrams schematically showing the construction of an electromagnetic pump incorporation-type intermediate heat exchanger 20 for a sodium-cooled reactor having an electrical output of 750 MWe. This piece of equipment 20 is a unit for exchanging heat of primary sodium and heat of secondary sodium in intermediate heat exchanger tubes 21. As shown in FIG. 3A, an electromagnetic pump 22 for driving the primary sodium is provided in the piece of equipment. As shown in FIG. 3B, the electromagnetic pump 22 has an electromagnetic pump duct (tubular channel) 23. A driving force is electromagnetically applied to the primary sodium by means of stators 24 placed inside and outside the electromagnetic pump duct 23. The electromagnetic pump duct 23 is formed as an annular channel to enable the stators 24 to be provided inside and outside the electromagnetic pump duct 23. The electromagnetic flowmeter 10 for measuring the rate or velocity of flow of liquid metal sodium (electroconductive fluid) flowing in the electromagnetic pump duct 23 is placed on the outer wall of the electromagnetic pump duct 23, as shown in FIG. 3C.

If, for example, the outside diameter of an outer duct (outer tube) member 23a of the electromagnetic pump duct 23 is 1630 mm; the thickness of the outer duct 23a is 10 mm; the outside diameter of an inner duct (inner tube) member 23b of the electromagnetic pump duct 23 is 1430 mm; and the thickness of the inner duct 23b is 10 mm, the size of each portion of the electromagnetic flowmeter 10 shown in FIG. 1 can be determined as described below. For example, the magnetic pole width, length and height of the S pole exciting coil 13 are set to 200 mm, 500 mm, and 110 mm, respectively; the magnetic pole width, length and height of the N pole exciting coil 13 are set to 100 mm, 500 mm, and 110 mm, respectively; the distance between the magnetic poles is set to 162 mm; the length and thickness of the plate portion 14 of the iron core 12 are set to 500 mm and 30 mm, respectively; and the distance between the electrodes is set to 300 mm. It is supposed that in this electromagnetic flowmeter 10 a magnetic flux density distribution such as shown in FIG. 4 can be obtained if the basic specifications of the exciting coils 13 are set as described below.

Figure 4:
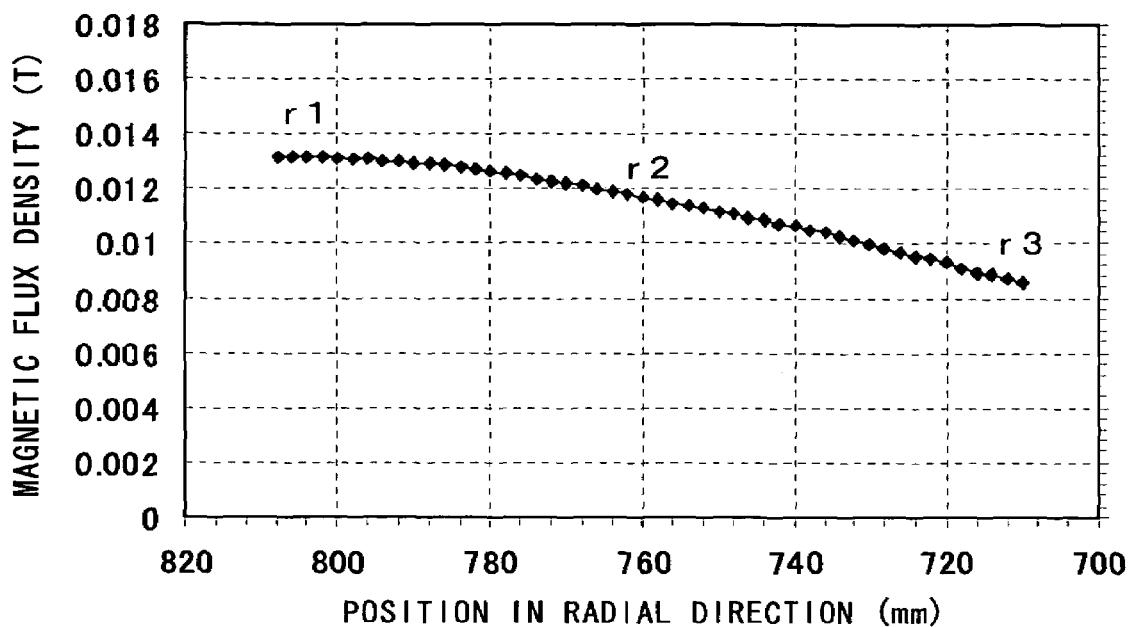
FIG. 4 is a graph showing the results of analysis of a magnetic flux density distribution produced in the case of application of the electromagnetic flowmeter shown in FIG. 1 to an electromagnetic pump duct of the heat exchanger shown in FIGS. 3A to 3C.

Wire size: 2×6 mm
Arrangement: 10 wires×8 layers
Coil section: 40×65 mm
Voltage: 24 V
Current: 20 A FIG. 4 is a graph showing the results of analysis of the magnetic flux density in the sodium flow path in the vicinity of the top end of the S-pole exciting coil 13 made by using a three-dimensional electromagnetic field analysis program (OPERA-3D). The ordinate of this graph represents the magnetic flux density, and the abscissa represents the radial position (r1 corresponding to the position of the outer duct 23a, r2 corresponding to a center of the sodium flow path, r3 corresponding to the position of the inner duct 23b). According to the analysis results, a magnetic flux density of 0.011 (T) or higher from the position (r1) of the outer duct 23a to the flow path center (r2) can be obtained.

With respect to the example of the construction shown in FIGS. 3A to 3C, it is considered that the influence of the magnetic flux from the outer duct 23a to the channel center on flow rate measurement is large because the electrodes 2a and 2b a replaced on the outer duct 23a. Therefore, approximate value of the output from the electromagnetic flowmeter 10 when the output of the liquid metal sodium-cooled fast breeder reactor is 100% (when the sodium flow velocity is about 12.5 m/sec) can be evaluated as a value of about 0.04 V by an equation shown below. Substantially the same measurement accuracy as that of the conventional electromagnetic flowmeter can be obtained.

Approximate value of output from the electromagnetic flowmeter=Magnetic flux density 0.011 T×Flow velocity 12.5 m/s×Distance between electrodes 0.3 m=0.04125 V.

In this embodiment, as described above, the two magnetic poles of the excitation device 11 and the electrodes 2a and 2b are collectively placed on the outer wall of the tubular channel at one side of the same, so that the size of the excitation device 11 can be effectively reduced in comparison with the conventional art. Thus, installation of the excitation device 11 can be facilitated and the cost of the device can be reduced.

Moreover, since the electromagnetic flowmeter of the present invention can form in the vicinity of a tubular channel the desired magnetic field suitable for measurement of the flow rate of an electroconductive fluid, it is capable of accurately measuring the rate or velocity of an electroconductive fluid in a tubular channel in which a main flow portion of the electroconductive fluid exists in the vicinity of a wall surface, e.g., a tubular channel having an annular sectional shape on which it is difficult to perform measurement with the conventional flowmeter, or a tubular channel having a rectangular sectional shape elongated in one-direction.

Second Embodiment

Figure 5:
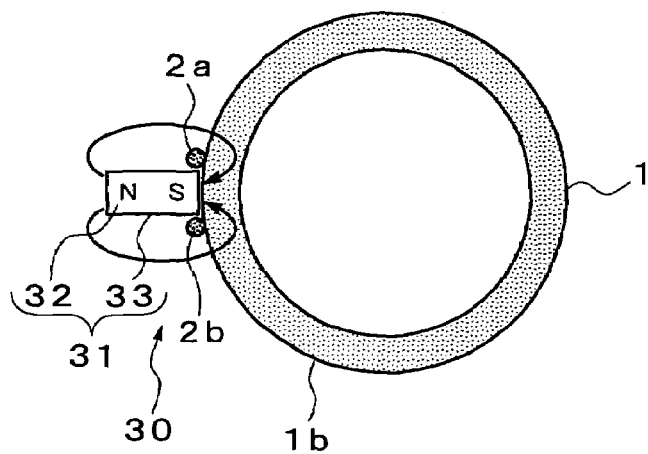
FIG. 5 is a sectional view of a second embodiment of the electromagnetic flowmeter in accordance with the present invention.

FIG. 5 shows a second embodiment of the electromagnetic flowmeter of the present invention. Components of the electromagnetic flowmeter in the second embodiment identical or corresponding to those in the first embodiment are indicated by the same reference characters, and the detailed description for them will not be repeated.

In the second embodiment, an excitation device 31 is constituted by an iron core 32 in the form of a column placed in a direction substantially perpendicular to the tubular channel outer wall 1b, and an exciting coil 33 wound around the iron core 32. In this embodiment, the magnetic pole at an end of the excitation device 31 on the tubular channel side is set as an S pole while the magnetic pole at an end opposite from the tubular channel 1 is set as an N pole. On opposite sides of the excitation device 31, electrodes 2a and 2b are symmetrically placed along the tubular channel outer wall 1b so as to straddle magnetic fluxes described below.

In the electromagnetic flowmeter 30 constructed as described above, when a current is applied to the exciting coil 33, magnetic fluxes are generated from the N pole to the S pole of excitation device 31 to form a magnetic field in the vicinity of the S pole of the excitation device 31 in a direction perpendicular to the tubular channel outer wall 1b (a diametric direction of the tubular channel 1). As a result, an electromotive force according to the flow rate of the electroconductive fluid in the channel 1a is generated in the electroconductive fluid in the vicinity of the S pole of the excitation device 31 in a direction perpendicular to both the direction of the magnetic field (diametric direction of the tubular channel 1) and the direction of flow of the electroconductive fluid (axial direction of the tubular channel 1), namely, in a direction along a line connecting the two electrodes 2a and 2b, in accordance with the Faraday's law of electromagnetic induction. This electromotive force is derived from the two electrodes 2a and 2b. The rate or velocity of flow of the electroconductive fluid is obtained from the measured value of the electromotive force.

The electromagnetic flowmeter 30 in this embodiment can also form in the vicinity of a tubular channel wall face the desired magnetic field suitable for measurement of the flow rate of an electroconductive fluid, as does the electromagnetic flowmeter in the first embodiment. Therefore the electromagnetic flowmeter 30 in this embodiment is also capable of accurately measuring the rate or velocity of an electroconductive fluid in a tubular channel in which a main flow portion of the electroconductive fluid exists in the vicinity of the wall surface, e.g., a tubular channel having an annular sectional shape.

Third Embodiment

Figure 6:
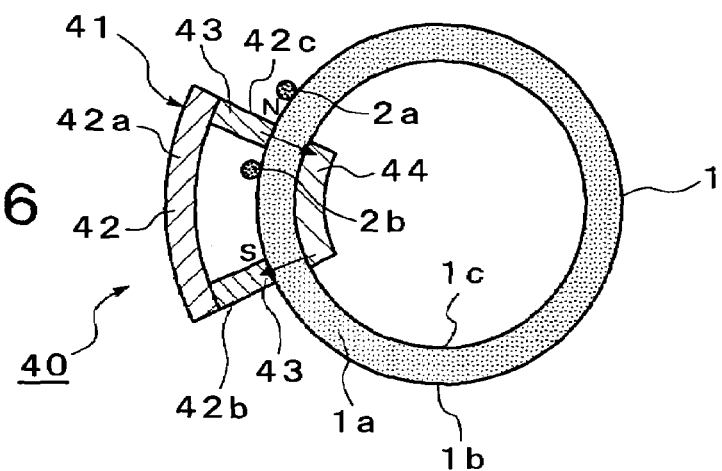
FIG. 6 is a sectional view of a third embodiment of the electromagnetic flowmeter in accordance with the present invention.

FIG. 6 shows a third embodiment of the electromagnetic flowmeter of the present invention. Components of the electromagnetic flowmeter in the first embodiment described above identical or corresponding to those in the first embodiment are indicated by the same reference characters, and the detailed description for them will not be repeated.

In the third embodiment, an excitation device 41 is constituted by a first iron core 42 generally U shaped, exciting coils 43 wound around the first iron core 42, and a second iron core 44 generally in the form of a plate curved into a circular-arc shape.

The first iron core 42 has a plate portion 42a having a circular-arc shape in section and placed along the outer wall 1b of the outer duct while being spaced apart from the same by a predetermined distance, and a pair of columnar portions 42b and 42c extending radially inwardly toward the outer wall 1b from opposite ends of the plate portion 42a as defined along the circumferential direction. In this embodiment, the magnetic pole at the top end of the columnar portion 42b at a lower position as seen in FIG. 6 is set as an S pole, while the magnetic pole at the top end of the columnar portion 42c at an upper position as seen in FIG. 6 is set as an N pole. Electrodes 2a and 2b are symmetrically placed on opposite sides of the N pole along the outer wall 1b.

The second iron core 44 is placed along an inner wall surface 1c of the inner tube member between a position at which it faces the top end (S pole) of the one columnar portion 42b and a position at which it faces the top end (N pole) of the other columnar portion 42c. If the second iron core 44 is placed in this way, a magnetic flux from the excitation device 41 is distributed so as to pass within the second iron core 44 without being widely distributed in the surrounding space, since the relative magnetic permeability of iron to vacuum is about 150. As a result, the density of the magnetic flux extending in the diametric direction across the channel 1a through which the electroconductive fluid flows is increased.

In the electromagnetic flowmeter 40 constructed as described above, when current is applied to each of the exciting coils 43, a magnetic flux is generated which extends from the N pole to the S pole of excitation device 41 via the second iron core 44, and magnetic fields are respectively formed in the vicinities of the N and S poles of the excitation device 41 in the radical direction across the channel 1a. As a result, an electromotive force according to the flow rate of the electroconductive fluid in the channel 1a is generated in the electroconductive fluid in the vicinity of each magnetic pole in a direction perpendicular to both the direction of the magnetic field (diametric direction of the tubular channel 1) and the direction of flow of the electroconductive fluid (axial direction of the tubular channel 1), namely, in a direction along a line connecting the two electrodes 2a and 2b, in accordance with the Faraday's law of electromagnetic induction. Of the electromotive forces thus generated, the electromotive force generated in the vicinity of the N pole is derived from the two electrodes 2a and 2b. The rate or velocity of flow of the electroconductive fluid is obtained from the measured value of the electromotive force.

The electromagnetic flowmeter 40 in this embodiment can also form in the vicinity of a tubular channel wall face the desired magnetic field suitable for measurement of the flow rate of an electroconductive fluid, as do the electromagnetic flowmeters in the first and second embodiments. Therefore the electromagnetic flowmeter 40 in this embodiment is also capable of accurately measuring the rate or velocity of an electroconductive fluid in a tubular channel in which a main flow portion of the electroconductive fluid exists in the vicinity of the wall surface, e.g., a tubular channel having an annular sectional shape.

The tubular channel 1 having an annular sectional shape has been described as a tubular channel with respect to each embodiment of the present invention byway of example. However, the present invention is not limited to this. For example, measurement can be performed on tubes of any other sectional shape, e.g., a rectangular sectional shape elongated in one direction.

While in each of the above-described embodiments one excitation device is placed on an outer peripheral portion of the tubular channel 1, a plurality of excitation devices may be placed along the circumferential direction of the tubular channel 1. In this way, a further improvement in the accuracy of measurement of the flow rate through the entire channel can be achieved.

The excitation device in each of the above-described embodiments comprises a direct-current type excitation device. Alternatively, a permanent magnet type excitation device or an alternating-current type excitation device can be used instead of the direct-current type excitation device. As the electroconductive fluid, any of fluids, e.g., liquid metals and electrolytic fluids including water may be measurable if the fluid is electroconductive. In the case of measuring the flow rate of water, however, it is desirable to use an alternating-current sine wave excitation method or alternating-current square wave excitation method, since the electrical conductivity of water is lower than that of liquid metals.

What is claimed is:

1. An electromagnetic flowmeter for measuring the flow rate of an electroconductive fluid flowing in a tubular channel, the electromagnetic flowmeter comprising:
    an excitation device for forming a magnetic field perpendicular to an outer wall of the tubular channel; and
    a pair of electrodes for measuring an electromotive force generated by the movement of the electroconductive fluid across the magnetic field,
    wherein the electrodes and two magnetic poles of the excitation device are collectively placed on the outer wall of the tubular channel at one side of the same.

2. The electromagnetic flowmeter according to claim 1, wherein the excitation device has an iron core including a plate portion placed along the outer wall of the tubular channel while being spaced apart from the same by a predetermined distance, and three columnar portions extending from opposite ends and a center of the plate portion, and exciting coils respectively wound around the columnar portions; currents are applied to the exciting coils such that the polarity of a magnetic pole appearing at the top end of the central columnar portion and the polarity of a magnetic pole appearing at the top end of the opposite-end columnar portions in the three columnar portions are opposite to each other; and the pair of electrodes are placed on opposite sides of the top end of the central columnar portion.

3. The electromagnetic flowmeter according to claim 1, wherein the excitation device has a columnar iron core placed in a direction generally perpendicular to the outer wall of the tubular channel, and an exciting coil wound around the iron core, and the pair of electrodes are placed on opposite sides of the iron core at an end of the iron core on the tubular channel side.

4. The electromagnetic flowmeter according to claim 1, wherein the excitation device has:
  a first iron core including a plate portion placed along the outer wall of the tubular channel while being spaced apart from the same by a predetermined distance, and a pair of columnar portions extending from opposite ends of the plate portion toward the outer wall of the tubular channel;
  a second iron core generally in the form of a plate placed between a position at which the second iron core faces the top end of one of the columnar portions through the channel for the electroconductive fluid interposed between the second iron core and the columnar portion, and a position at which the second iron core faces the top end of the other columnar portion through the channel for the electroconductive fluid; and
  exciting coils respectively wound around the columnar portions of the first iron core,
  wherein the pair of electrodes are placed on opposite sides of the top end of one of the columnar portions of the first iron core.

5. The electromagnetic flowmeter according to claim 1, wherein the fluid flowing in the tubular channel is a fluid of low electrical conductivity, and excitation by the excitation device is performed as alternating-current since wave excitation or alternating-current square wave excitation.

6. An electromagnetic flowmeter for measuring the flow rate of an electroconductive fluid flowing in a tubular channel, the electromagnetic flowmeter comprising:
  an excitation device having two magnetic poles placed at one side of an outer wall of the tubular channel, one of the magnetic poles being placed so as to stand upright on the outer wall of the tubular channel, the other magnetic pole being placed so that the direction of a magnetic field formed in the vicinity of said one of the magnetic poles is perpendicular to the outer wall of the tubular channel; and
  a pair of electrodes symmetrically placed on opposite sides of said one of the magnetic poles to measure an electromotive force generated by the movement of the electroconductive fluid across the magnetic field in the vicinity of said one of the magnetic poles.

7. The electromagnetic flowmeter according to claim 6, wherein the excitation device has an iron core including a plate portion placed along the outer wall of the tubular channel while being spaced apart from the same by a predetermined distance, and three columnar portions extending from opposite ends and a center of the plate portion, and exciting coils respectively wound around the columnar portions; currents are applied to the exciting coils such that the polarity of a magnetic pole appearing at the top end of the central columnar portion and the polarity of a magnetic pole appearing at the top end of the opposite-end columnar portions in the three columnar portions are opposite to each other; and the pair of electrodes are placed on opposite sides of the top end of the central columnar portion.

8. The electromagnetic flowmeter according to claim 6, wherein the excitation device has a columnar iron core placed in a direction generally perpendicular to the outer wall of the tubular channel, and an exciting coil wound around the iron core, and the pair of electrodes are placed on opposite sides of the iron core at an end of the iron core on the tubular channel side.

9. The electromagnetic flowmeter according to claim 6, wherein the excitation device has:
  a first iron core including a plate portion placed along the outer wall of the tubular channel while being spaced apart from the same by a predetermined distance, and a pair of columnar portions extending from opposite ends of the plate portion toward the outer wall of the tubular channel;
  a second iron core generally in the form of a plate placed between a position at which the second iron core faces the top end of one of the columnar portions through the channel for the electroconductive fluid interposed between the second iron core and the columnar portion, and a position at which the second iron core faces the top end of the other columnar portion through the channel for the electroconductive fluid; and
  exciting coils respectively wound around the columnar portions of the first iron core,
  wherein the pair of electrodes are placed on opposite sides of the top end of one of the columnar portions of the first iron core.

10. The electromagnetic flowmeter according to claim 6, wherein the fluid flowing in the tubular channel is a fluid of low electrical conductivity, and excitation by the excitation device is performed as alternating-current since wave excitation or alternating-current square wave excitation.

* * * * *